“United States Patent Office” — 3,062,816 — Patented Nov. 6, 1962

3,062,816
NEW DERIVATIVES OF THE 6H-1,3-THIAZINE SERIES
Erich Ziegler, Graz, Austria, assignor to Geigy Chemical Corporation, Ardsley, N.Y., a corporation of Delaware
No Drawing. Filed June 23, 1961, Ser. No. 119,052
Claims priority, application Switzerland June 24, 1960
5 Claims. (Cl. 260—243)

The present invention concerns new heterocyclic amines which can be used as pharmaceuticals and intermediate products for the production of same.

It has now surprisingly been found that heterocyclic amines of the 6H-1,3-thiazine series of the general formula

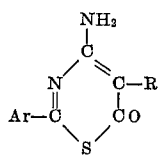

(I)

wherein

Ar represents the phenyl or the p-chlorophenyl radical, and

R represents hydrogen or an alkyl radical with 1–4 carbon atoms, are obtained if a possibly substituted thiobenzamide of the general formula

(II)

is reacted in the presence of a condensing agent, in particular phosphorus oxychloride or phosphorus trichloride, with cyanoacetic acid or a substituted cyanoacetic acid of the general formula

(III)

wherein Ar and R have the meanings given above. The reactions are performed in the presence of the condensing agents mentioned at, for example, temperatures between 60° and the boiling temperature of the condensing agent, preferably in the absence of solvents or diluents.

In the new heterocyclic amines of the general Formula I, Ar is a phenyl or a p-chlorophenyl radical and R is hydrogen or a methyl, ethyl, n-propyl, isopropyl, n-butyl, isobutyl, sec. butyl or tert. butyl radical.

Starting materials of the general Formulae II and III are known and easily accessible so that no further details are necessary regarding the production of the starting materials.

It has also been further found that compounds of the general Formula I have valuable pharmacological properties, in particular antiphlogistic, antipyretic and diuretic activity and, in addition, they are also suitable as intermediates for the production of other pharmacologically valuable new substances.

The following examples illustrate the production according to the invention of the new heterocyclic amines without limiting the scope of the invention. Parts are given therein as parts by weight and their relationship to parts by volume is as that of grammes to cubic centimetres. The temperatures are in degrees centigrade.

*Example 1*

1.4 parts of thiobenzamide, 1 part of cyanoacetic acid and 2.3 parts by volume of phosphorus oxychloride are refluxed on a water bath for 5 minutes at 75°. The reaction mixture becomes cherry red and hydrogen chloride is strongly developed. After cooling, about 60 parts of water are added to decompose whereupon pale brown flakes are formed. These are filtered off and dissolved as far as possible in 2 N-caustic soda lye. The insoluble residue is dissolved in alcohol in the warm and water is added to the hot solution until it becomes opaque. After cooling, the golden yellow crystals of 2-phenyl-4-amino-6-oxo-1,3-thiazine which separate out are filtered off.

The substance melts at 213° and, after a further recrystallisation, at 216°.

*Example 2*

1.7 parts of 4-chlorothiobenzamide, 1 part of cyanoacetic acid and 2.0 parts by volume of $POCl_3$ are reacted analogously to Example 1 and the product is worked up to 2-(4-chlorophenyl)-4-amino-6-oxo-1,3-thiazine.

*Example 3*

1.2 parts of methylcyanoacetic acid, 1.37 parts of thiobenzamide and 2.3 parts by volume of phosphorus oxychloride are first mixed together at 20° whereupon a noticeable reaction already occurs. The mixture is then heated first for 20 minutes at 60° and finally for 10 minutes at 80°. After cooling, water is added to decompose, and the crude oily product which separates is left to stand for 14 hours in dilute caustic soda lye whereupon 2-phenyl-4-amino-5-methyl-6-oxo-1,3-thiazine gradually separates out in crystalline form. M.P. 185° (from dioxan).

*Example 4*

1.4 parts of thiobenzamide, 1.7 parts of isobutylcyanoacetic acid and 1.4 parts by volume of phosphorus oxychloride are heated for 40 minutes at 75°, the reaction mixture is decomposed with water and the oily crude product is left to stand for 24 hours in dilute caustic soda lye. The 2-phenyl-4-amino-5-isobutyl-6-oxo-1,3-thiazine which separates out is crystallised from alcohol, whereupon needles which melt at 180° are obtained.

*Example 5*

The mixture of 1.0 part of methyl cyanoacetic acid, 1.7 parts of 4-chlorothiobenzamide and 2.0 parts by volume of $POCl_3$ is reacted analogously to Example 3 and the reaction product is then worked up whereupon 2-(4-chlorophenyl)-4-amino-5-methyl-6-oxo-1,3-thiazine is obtained in crystalline form.

*Example 6*

1.4 parts of n-butyl cyanoacetic acid, 1.4 parts of thiobenzamide and 0.86 part by volume of phosphorus oxychloride are heated for 30 minutes at 75° and the reaction mixture is worked up analogously to Example 4. Crystallised from alcohol, the 2-phenyl-4-amino-5-n-butyl-6-oxo-1,3-thiazine is obtained in yellow crystals which melt at 131°.

What I claim is:
1. A compound of the formula

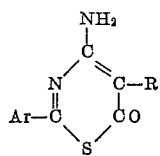

wherein

Ar is a member selected from the group consisting of phenyl and p-chlorophenyl, and R is a member selected from the group consisting of hydrogen and alkyl with 1 to 4 carbon atoms.

2. 2-phenyl-4-amino-6-oxo-1,3-thiazine.
3. 2-phenyl-4-amino-5-methyl-6-oxo-1,3-thiazine.
4. 2-phenyl-4-amino-5-isobutyl-6-oxo-1,3-thiazine.
5. 2-phenyl-4-amino-5-n-butyl-6-oxo-1,3-thiazine.

References Cited in the file of this patent

Chemical Abstracts, vol. 28, p. 3736 (1934).